United States Patent
Rebeaud

(10) Patent No.: US 6,213,676 B1
(45) Date of Patent: Apr. 10, 2001

(54) DEVICE FOR HOT-PRESSURE TRANSFER OF METALLIC FILMS ONTO A SUBSTRATE OF PAPER OR CARDBOARD

(75) Inventor: Jean-Claude Rebeaud, Le Mont-sur-Lausanne (CH)

(73) Assignee: Bobst, S.A., Lausanne (CH)

( * ) Notice: Subject to any disclaimer, the term of this patent is extended or adjusted under 35 U.S.C. 154(b) by 0 days.

(21) Appl. No.: 09/187,167

(22) Filed: Nov. 6, 1998

(30) Foreign Application Priority Data

Nov. 17, 1997 (CH) .................................... 2650/97

(51) Int. Cl.⁷ ...................................................... F16B 7/00
(52) U.S. Cl. ............................. 403/188; 403/187; 403/13
(58) Field of Search ................................. 403/188, 187, 403/189, 13, 14, 343, 362, 337

(56) References Cited

U.S. PATENT DOCUMENTS

| 1,369,909 | 3/1921 | Turner . | |
|---|---|---|---|
| 1,587,254 | * 6/1926 | Taseff ................................ | 403/187 X |
| 3,226,838 | 1/1966 | Courrege . | |
| 3,377,685 | * 4/1968 | Carlstedt ................................ | 403/14 |
| 4,409,063 | 10/1983 | Brown . | |
| 4,892,431 | * 1/1990 | Bachmann et al. ................... | 403/187 |
| 4,932,805 | * 6/1990 | Mullen et al. .......................... | 403/13 |

FOREIGN PATENT DOCUMENTS 1149797  12/1957  (FR) .
1332672  10/1973  (GB) .

* cited by examiner

Primary Examiner—Lynne H. Browne
Assistant Examiner—John R. Cottingham
(74) Attorney, Agent, or Firm—Allen N. Friedman; McCarter & English L.L.P.

(57) ABSTRACT

This device comprises devices (11–13) for securing tools (10) to a supporting and heating plate (3). The heat exchange surface of the supporting and heating plate (3) is continuous, the securing devices (11–13) being arranged to permit securing of each of these tools (10) in any position within an adjusting range determined on the surface of the supporting and heating plate (3). This permits adjusting the position of, the securing the tools (10) to the supporting and heating plate (3). This device also comprises devices (7–9) for positioning the supporting and heating plate (3) on a removable frame (1) of a press for hot transfer of portions of metallic films onto a paper or cardboard substrate.

3 Claims, 2 Drawing Sheets

DEVICE FOR HOT-PRESSURE TRANSFER OF METALLIC FILMS ONTO A SUBSTRATE OF PAPER OR CARDBOARD

RELATED APPLICATIONS

This application claims priority from Switzerland No. 1997 2650/97, filed Nov. 17, 1997.

BACKGROUND OF THE INVENTION

This invention relates to a device for positioning and securing plate-shaped tools on a supporting and heating plate, intended for cutting of portions of metallic films and their hot-pressure transfer onto a paper or cardboard substrate, this device comprising means for securing said tools on said supporting and heating plate.

Relatively thick plates known as honeycomb plates in which are bored a plurality of evenly distributed rows of holes are already in use. These plates are adapted to receive a defined number of tools, constituting a type of printing plate, positioned and secured on the supporting plate. Such a supporting plate, thus provided with printing plates, is mounted in a machine that is fed with cardboard or paper blanks on the one hand and with metallic film webs on the other hand, for the cutting of metallic film portions and their hot transfer onto the cardboard blanks by the tools positioned on the supporting plate. Such mechanisms are, for example, used for printing onto packages. Usually the transfer or deposit of metallic films follows the operation of printing on the cardboard blanks. Thus, it is important that the printing plates be positioned accurately so that the transfer or deposit of the metallic films registers exactly with the imprints made by the printing operation.

One of the difficulties encountered in this process is that the transfer and the printing of these metallic film portions are performed in the hot state. Due to this fact, it is necessary to accurately adjust the position of the printing plates with respect to the operating temperature, taking into account the expansion of the supporting and heating plate from the ambient temperature to the operating temperature and the corresponding change of the respective positions of the printing plates on the supporting and heating plate.

Because of the cost of such a supporting and heating plate, in which the holes are highly accurate borings, it would be too expensive to use it to print only one packaging pattern. Consequently, only one supporting and heating plate is generally used for each machine. When changing the printing job it is, thus, necessary to remove the printing plates from the supporting plate and to position other printing plates corresponding to the next job. Since the printing plates operate in the hot state, this positioning must be performed on a plate having a temperature that corresponds to the operating temperature. Consequently, these requirements make the positioning operation difficult and exceedingly long. This operation typically takes a working day for each job change on a supporting and heating plate. Obviously, the cost of this operation impacts more heavily the cost of the printed workpieces in the case of relatively small printing jobs. Moreover, since the function of the supporting plate is not only to position the tools but also to heat them by contact, the use of a perforated plate substantially diminishes the contact surface at which the heating exchange takes place, and, thus reduces the efficiency of heating the tools.

SUMMARY OF THE INVENTION

The aim of the present invention is to meet, at least partly, the above-mentioned difficulties. For this purpose, the object of this invention is to produce a device for positioning and securing plate-shaped tools on a metallic supporting and heating plate, for the cutting and the hot-pressure transfer of portions of metallic films onto a paper or cardboard substrate according to claim 1.

The inventive device comprises a relatively thin, removable plate on which the tools are mounted. The plate is mounted into a frame. The advantage of this device is that the tools have to be mounted only once on the supporting and heating plate after which, when the job has to be changed after use and another configuration of printing plates has to be used, the device is removed from the frame on which it is positioned and secured, in order to store it for a subsequent use. Then, it is replaced on the printing press, by another plate, which is itself provided with means for position it accurately on the frame that is removably mounted on the press.

Preferably, it is secured by flat head screws. These screws are provided with, on the one hand, a precise clearance with the holes through the tool to be secured, adapted for the passage of these screws and, on the other hand, with the edge of each annular seat, concentric with each hole in order to receive the screw head. This arrangement allows the positioning of this tool in a precisely defined position on the surface of the supporting and heating plate. In this way it is enough to make a first approximately registration of the position of the printing plates, after which an accurate adjustment can be performed due to the clearance between the tightening screw and the screw apertures as well as between the screw heads and the annular seats that surround the apertures and are used to clamp the printing plates.

Other features and advantages of the present invention will become evident from the following description and from the enclosed drawing which illustrates, schematically and by way of example, an embodiment of the device that is object of the present invention.

DETAILED DESCRIPTION OF THE INVENTION

Figure 1:
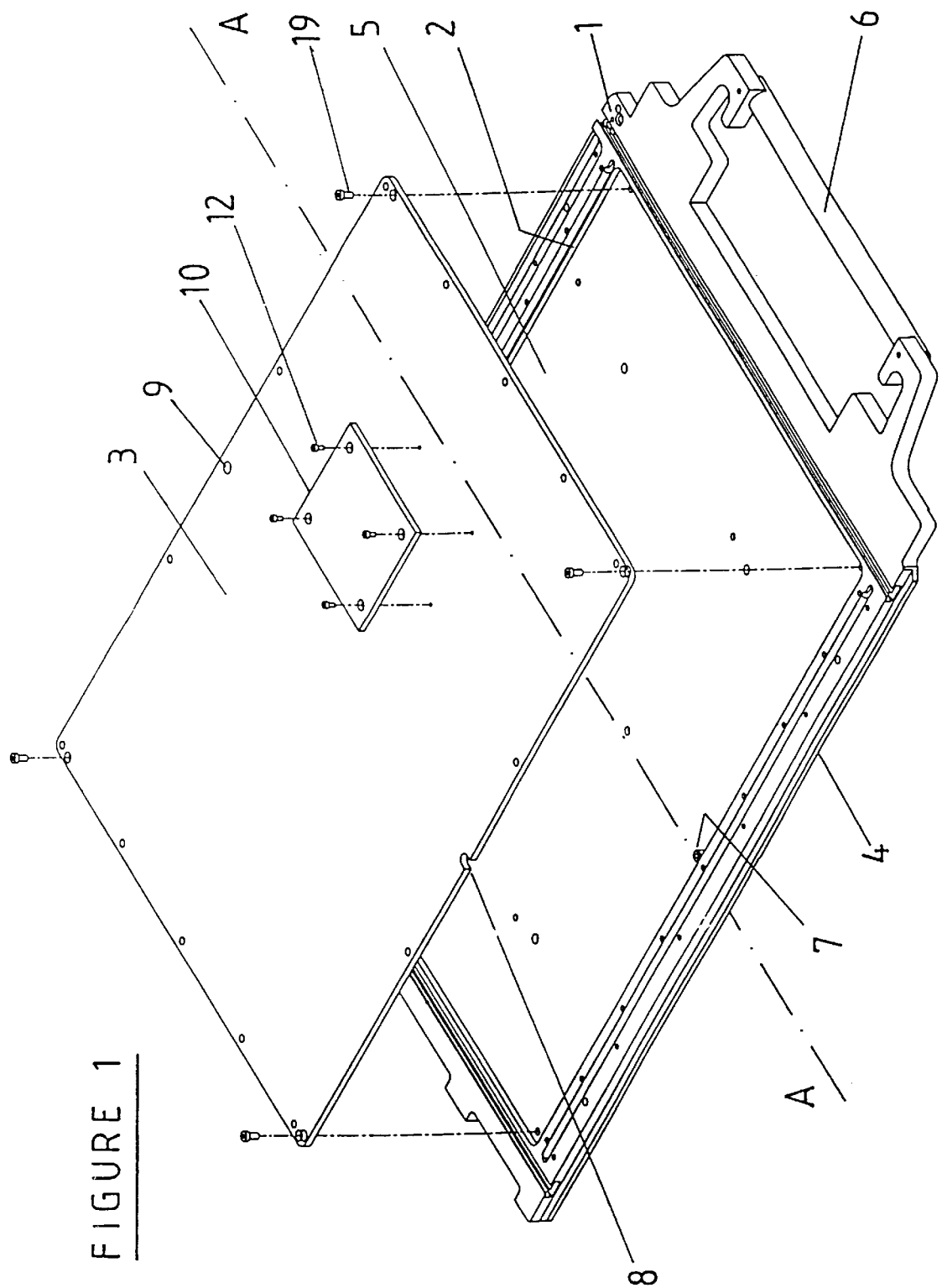
FIG. 1 is an exploded perspective view of an exemplary device of the invention.

The device illustrated in FIG. 1 includes a frame 1 adapted to be slidably mounted in a press (not represented) for the hot transfer printing of metallic films onto substrates, generally consisting of paper or cardboard blanks typically intended to form cardboard packages. For this purpose, the frame is designed like a slide comprising a rectangular seat 5 surrounded by a shoulder 2 adapted to receive a supporting and heating plate 3. The height of the shoulder 2 corresponds to the thickness of the supporting and heating plate 3. The means for heating the supporting and heating plate 3 are part of the press in which the frame 1 is slidably mounted. Thus, the heating means, which are not a part of the present invention are not necessary to its understanding and are not illustrated.

This sliding frame 1 also includes two parallel lateral rails 4 positioned along two opposite edges of the frame, such that only one of these rails 4 is visible in FIG. 1, in order to allow its mounting in sliding motion in the above-mentioned printing press.

The frame 1 is additionally provided, as a slide, with a handle 6 in order to permit its removal and its loading on the aforesaid press by sliding the lateral rails 4 in the press' corresponding guides (not illustrated).

The seat 5 of this sliding frame 1 includes two positioning pins 7 (only one of which being visible in FIG. 1) aligned along the travelling axis A—A of the sheets or blanks of paper or cardboard with respect to the sliding frame 1. This axis is, thus, transverse to the sliding axis of the frame 1 in the press, such as defined by the lateral rails 4. These pins are adapted to cooperate respectively with a positioning notch 8, situated along an edge of the supporting and heating plate 3, and with an aperture 9, situated near the opposite edge of this same plate 3. Four screws 19 situated in the four corners of the supporting and heating plate 3 are used to secure it to the sliding frame 1.

Except for holes used to position and secure it, the supporting and heating plate 3 is a plate with continuous surface, adapted to receive one or a plurality of tools 10 for cutting and transferring portions of metallic sheets in selected places on the paper or cardboard sheets or blanks. These tools 10, which act as printing plates, consist of small plates, the shapes of which correspond to the shapes different patterns to be deposited onto the substrate.

One of these tools 10 is illustrated in FIG. 1 but obviously, a plurality of tools in different shapes is possible, distributed over the supporting and heating plate 3, corresponding to the film portions to be transferred onto the substrate. Each of these printing plates 10 must be very accurately positioned on the supporting and heating plate 3 and then, secured to the plate 3.

Figure 2:
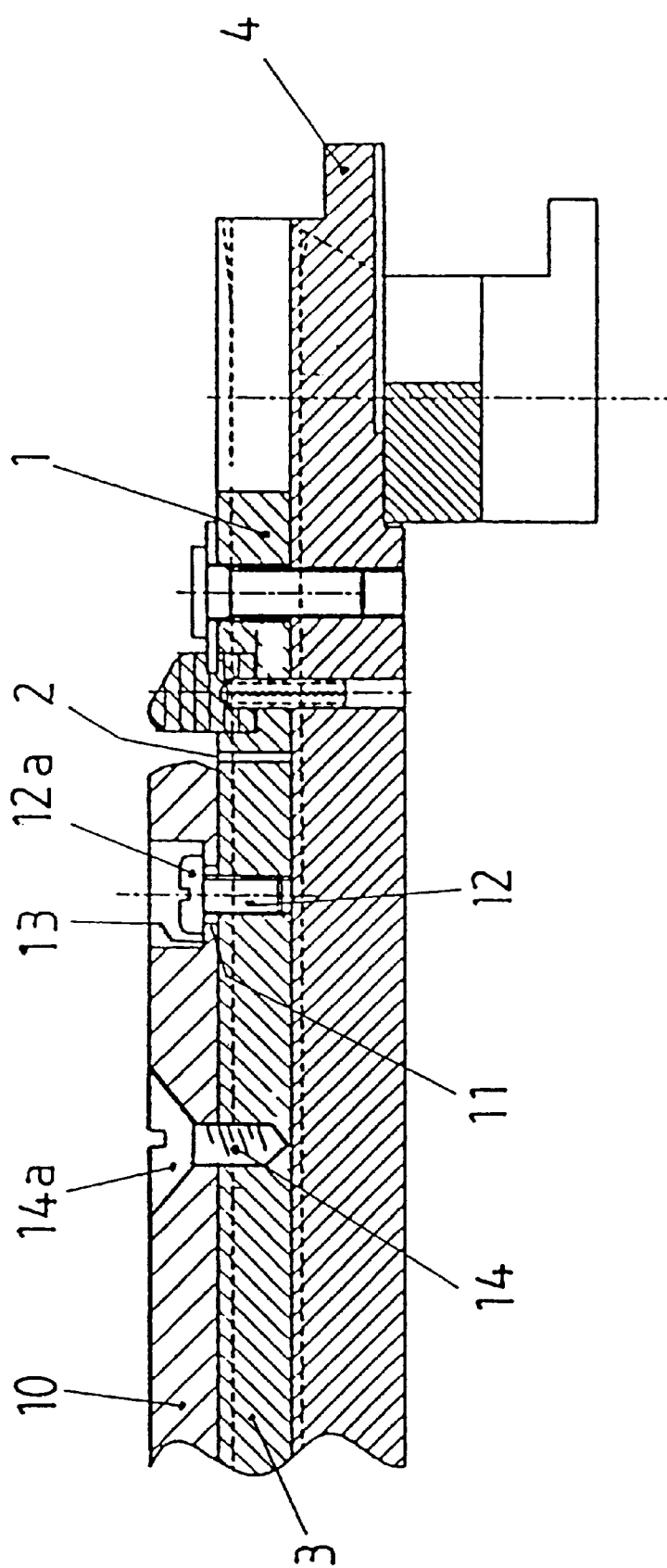
FIG. 2 is a partial section view of the device of FIG. 1; according to line A—A.

FIG. 2 illustrates a positioning mode for these printing plates 10 on the supporting and positioning plate 1. The printing plate 10 includes holes 11, one of which is visible in FIG. 2, for the passage of the tightening screw 12, the head 12a of which comes to rest against an annular seat 13 surrounding the hole at the bottom of a well 11, adapted to countersink this screw head 12a in the thickness of the supporting and heating plate 3. This screw 12 is screwed in the supporting and heating plate 3. As can be seen in FIG. 2, the respective diameters of the hole 11 and the annular seat 13 are substantially larger than those of the screw 12 and the head 12a of the screw 12.

Owing to the printing plate 10 securing mode, an adjustment range is provided with respect to the position of the tightening screws 12 in the supporting and heating plate 3. Consequently, one needs only to position each of the printing plates 10, with an adequate approximation, on the supporting and heating plate 3. This position may correspond to the position of these printing plates 10 when the supporting and heating plate is at ambient temperature. Once this position is determined, the printing plates can, for example, be temporarily held in this position by means of magnets arranged around these printing plates, in order to enable the registration of the position of the threaded holes for the screws 12 on the supporting and heating plate 3. Afterwards, the threaded holes are drilled in the plate 3 and the screws can be screwed, securing the printing plates 10 in an initial approximate position.

Given this initial position of the printing plates 10, it is possible to perform the accurate adjustment of their positions in the hot state. For this purpose, it is sufficient to perform a hot printing of the metallic film or films on the cardboard or paper blanks. Generally, this printing by means of metallic film is carried out on blanks that have been previously printed. The respective positions of the printed portions of metallic film must correspond accurately, for example to less than 0.1 mm, to the positions of the patterns formed by printing. In order to adjust the position of the printing plates 10, it is sufficient to measure the displacement between the imprint and the metallic printing that is superposed and to accordingly correct the positions of the respective printing plates 10.

This operation should be repeated as long as visible displacements between the imprints and the printing of the metallic films are observed. In order to carry out these adjustments, it is thus sufficient to unscrew the screws 12 and to move the printing plates in the appropriate direction, in an amount corresponding to the displacement observed on the printing, after which one needs only to retighten the screws 12.

As an alternative, the screws 12 with flat head 12a allowing the adjustment could be combined with screws 14 with countersunk head 14a, as illustrated in FIG. 2. In this case, the threaded holes positioned in the supporting and heating plate 3 adapted to these screws 14 with countersunk head 14a are drilled after the accurate position of the printing plates has been determined, as previously explained. These countersunk head screws can be used to maintain the accurate adjusted position of the printing plates 10.

When another arrangement of the printing plates must be used, in order to carry out another job on other blanks, the four screws 19 that hold the supporting and heating plate 3 on the frame 1 will be simply unscrewed and it will be replaced by another plate 3 that includes the same positioning reference markers 8 and 9 as the preceding one. The position of the printing plates corresponding to the new job does not have to be adjusted again so that the printing operation of the metallic films can start as soon as the replacement has been carried out. The removed supporting and heating plate 3 is stored for subsequent use.

In this way, the adjustment must be performed only once for a given configuration of printing plates 10. It is sufficient then to choose the supporting and heating plate 3 including the correct configuration of printing plates 10 from the preceding plates. The positioning device for transfer and printing of metallic films onto substrate according to the invention, thus, doesn't need any adjustment operation when changing the work on the presses.

The fact that the supporting and heating plate 3 used in this device is a plain plate, i.e., a plate without honeycomb perforations, presents two advantages with respect to the honeycomb plates of prior art. One the one hand, they are much less expensive to manufacture, so that it becomes possible and profitable to use only one supporting and heating plate 3 for each job and to have as many of these plates as there are jobs to be carried out on the press. On the other hand, the absence of rows of holes forming the honeycomb, increases the contact surface between the supporting and heating plate 3 and the printing plates 10, and thus improves the heat transfer and hence, the printing plates' heating efficiency.

It is understood that the present invention is not limited to the securing mode that has been described in this example. Other securing modes allowing, adjustment of the position of the printing plates after unscrewing in a defined position in order to allow adjustment of their positions can be used.

What is claimed is:

1. A device positioning and securing, tools (10) in the shape of small plates for cutting and hot-pressure transfer of portions of metallic films onto paper or cardboard substrate, on a supporting and heating plate (3), this device comprising first securing means (11–13) for said tools (10) on said supporting and heating plate (3), wherein the heat exchange surface of said supporting and heating plate (3) is continuous, the first securing means (11–13) being arranged so as to permit securing each of these tools (10) in any position within an adjusting range determined on the surface of said supporting and heating plate (3), in order to allow adjusting the position, then the securing said tools (10) on said supporting and heating plate (3) in an adjusted position, and that it comprises positioning means (7–9) for the positioning the supporting and heating plate (3) on a removable frame (1) of a press for hot transfer of portions of metallic films, in which the first securing means include screws (12) with flat heads (12a), the tools (10) comprising, for each of said screws (12), a well of diameter substantially larger than the diameter of the flat head (12a) and height greater than the thickness of the flat head (12a), the well being terminal at its lower end by an annular seat (13) defining an aperture (11), of a diameter substantially larger than said screw's (12) diameter, the spacing between the diameter of said aperture (11) and the diameter of said screw (12) determining the adjusting range, the diameter of the well being larger than the diameter of the head (12a) by at least said adjusting range.

2. A device of claim 1, in which, in addition to the first securing means (11–13) arranged so as to permit securing each of these tools (10) in any position inside the adjusting range determined on the surface of said supporting and heating plate (3), the device comprises second securing means consisting of a screw (14) with countersunk head (14a) adapted for securing said tools in said adjusted position.

3. A device of claim 1 in which the positioning means (7–9) for positioning the supporting and heating plate (3) on the removable frame (1) include, pins (7) on said frame (1) and holes (8,9) on said supporting and heating plate (3) sized to engage said pins (7), positioned along a line corresponding to the travel direction of said substrates on said press.

* * * * *